April 4, 1967           H. R. LEWIS           3,312,905
HIGH POWER LASER INCORPORATING PLURAL TUNABLE AMPLIFIER STAGES
Filed June 24, 1963
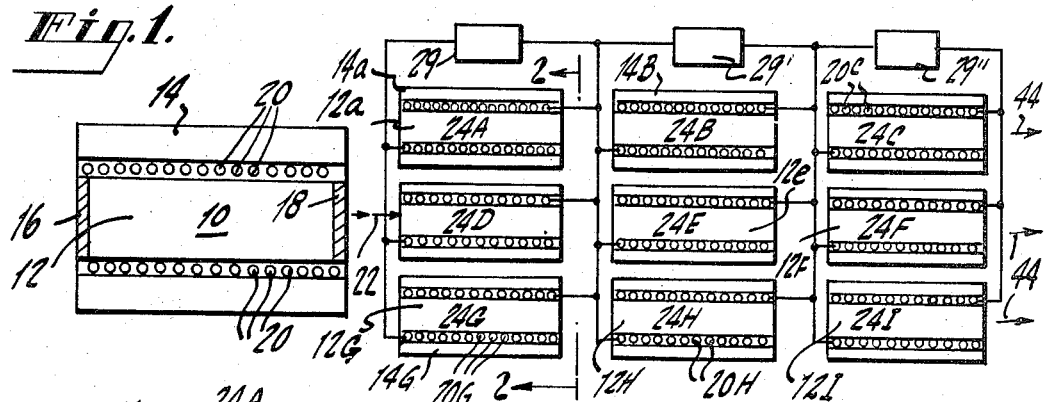
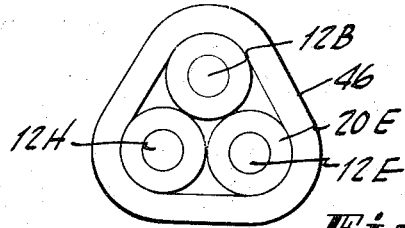
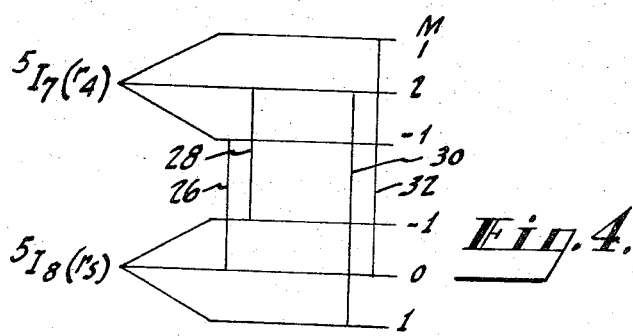
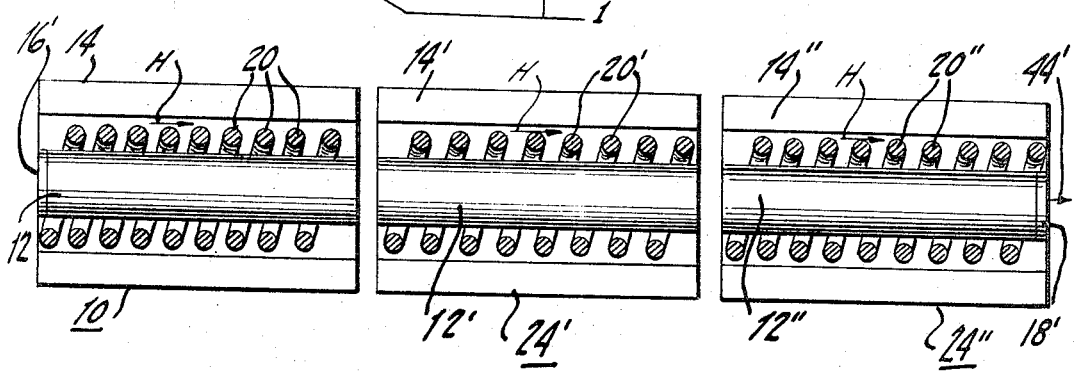
INVENTOR.
HENRY R. LEWIS
BY
Attorney

United States Patent Office 3,312,905
Patented Apr. 4, 1967

3,312,905
HIGH POWER LASER INCORPORATING PLURAL TUNABLE AMPLIFIER STAGES
Henry R. Lewis, Princeton, N.J., assignor to Radio Corporation of America, a corporation of Delaware
Filed June 24, 1963, Ser. No. 290,125
7 Claims. (Cl. 330—4.3)

This invention relates to optical masers or lasers. In particular, this invention relates to a novel method of and means for producing and controlling a high power coherent light beam from a laser.

The term laser is a named used to refer to a device which provides "light amplification by stimulated emission of radiation." The laser device is most commonly used as a source of coherent light.

In general, a laser includes an acitve laser material that will produce stimulated emission of radiation and an excitation source of energy that pumps power into the active material. Usually, it is desirable for feedback purposes, to position the active material in an optically resonant structure or resonant cavity.

The active material of a laser has two energy levels, or atomic states, separated in energy by an amount corresponding to a characteristic output frequency. The active material includes atoms which are characterized by the properties that (1) orbital electrons, or ions, of the atoms may be excited into the higher of the two energy levels, and thus an inverted population density condition may be produced, and (2) when the orbital electrons return to the lower energy level, the active material emits light. The emitted light is such that, within the active material, an incident photon stimulates an excited atom to emit another photon in phase with the incident photon. Thus, ideally, all of the emitted light is substantially in phase and is described as coherent light.

The pumping source is a source of energy used to excite the electrons or ions in the active material to the higher energy level. The pumping sources may be for example, an RF field for an electrically pumped laser, or a xenon flash tube for an optically pumped laser.

In order to resonate or feedback the stimulated light, a resonant structure or resonant cavity is used. The optical resonant cavity normally includes two light-reflecting surfaces, such as mirrors, positioned adjacent to the opposite ends of the active laser material. At least a portion of one of the light-reflecting surfaces is at least partially transparent so that an output light may be obtained from the laser. The light-reflecting surfaces are precisely oriented so that a resonant mode exists between the mirrors at frequencies of which the spacing between mirrors corresponds to a path length of an integral number of half wave lengths of the light frequency emitted.

A laser of the type briefly described above may be used for many purposes, e.g., welding, drilling and machining. The laser device is made to store the energy in the inverted population density condition, and then, in a controlled manner, this stored energy is swept out as a high power pulse or pulses of coherent light. In order to efficiently and economically store the pumped energy, it is desirable that the means which switches from the "storage" condition to the "sweep out" or discharge of the high power energy be a switching means of relatively low power and be electrically controlled.

It is therefore an object of this invention to provide an improved high power laser device.

It is another object of this invention to provide a novel laser structure characterized in that the device produces high power output light.

It is a further object of this invention to provide a novel method and means for internally, electrically modulating amplification of the power in a laser.

These and other objects are accomplished in accordance with this invention by providing a laser device including a plurality of aligned active laser body sections. By means of a pumping source of energy adjacent to the laser sections, an inverted population density condition is established in each of the sections. By means of different magnetic fields applied to each of the sections, the inverted population condition may be "stored" in each section without substantial loss of energy in one section due to emission stimulated by fluorescence from the other sections. By switching the individual magnetic fields, so that all sections that are in optical alignment are in a magnetic field of substantially the same magnitude, a sweep out of the stored energy is produced resulting in an extremely high power output laser beam.

In an embodiment of the invention, a laser "oscillator" is positioned to "sweep out" a plurality of laser "amplifier" sections. During the storage condition, the amplifiers are all tuned to different frequencies, by means of the magnetic fields, so that a minimum of uncontrolled stimulated emission sweep-out occurs. When the laser "oscillator" is fired, the "amplifiers" are all switched to a frequency substantially matching that of the laser oscillator by switching the magnetic fields, which thus provides the high power output. In another embodiment, the laser "amplifier" sections and the laser "oscillator" are all positioned within the optical resonant cavity.

In either case, the active laser body is made of a material which produces a fluorescent line width that is small. By small is meant that $$\Delta \nu < \frac{gBH}{h}$$

where H is a magnetic field of the order of 50 gauss or less, g is the g factor, B is the Bohr magnetron, and h is Planck's constant. When this relation is satisfied, relatively low input power to the magnetic control devices may be used to control the laser frequency and thus control the high power output beam.

During storage, the controlling magnetic fields are applied to the active laser body sections so that the individual "amplifier" sections are tuned to different frequencies. In other words, the frequency is staggered from section to section to substantially reduce the total gain of the amplifier. The stored energy is released rapidly, by suddenly applying a uniform magnetic field to the entire device. Simultaneously, a pulse of coherent light of the appropriate frequency is introduced at the input of the amplifier.

The invention will be described in greater detail by reference to the accompanying drawings wherein similar reference characters refer to similar elements and:

FIGURE 1 is a schematic view of a high power laser device embodying the invention and having separate laser oscillator and laser amplifier sections with the amplifier sections spaced apart for simplicity of illustration;

FIGURE 2 is an assembled end view, taken along line 2—2 of the device in FIGURE 1;

FIGURE 3 is an end view of a modification of the embodiment shown in FIGURE 1;

FIGURE 4 is an energy level diagram of the laser transitions that occur in an active laser body of the type exhibiting the desired properties;

FIGURE 5 is a sectional view of an embodiment of this invention wherein the laser oscillator and laser amplifier sections are all positioned within the resonant cavity.

Referring now to FIGURES 1 and 2, there is shown a laser "oscillator" device 10 for producing coherent radiation. The laser 10 comprises a solid active laser body 12, a laser pumping source 14, and a pair of optical reflecting surfaces 16 and 18. The optical reflecting surfaces 16 and 18 form the ends of a resonant body or optical resonant cavity in which the solid active laser body is positioned.

The solid active body 12 may comprise any substance which has at least two atomic states or energy levels separated by an amount corresponding to the output frequencies desired and which has the property of being excitable into an inverted population density condition. The solid active laser body 12, when pumped by the source 14 below the threshold level, emits light (fluoresces) spontaneously. When the pump power level is above a predetermined level, the inverted population condition passes a threshold level, oscillations tend to occur throughout the active body, and the output light is a coherent light. The solid active laser body 12 is a triggering device which is capable of providing a short, e.g. one microsecond or less, pulse of light at the appropriate frequency for the amplifier as will be explained. The emission of the pulse should be controllable and it may be made of the same material as the amplifier stages. Examples of solid active laser materials which could be used in the triggering device are calcium fluoride doped with divalent thulium and calcium fluoride doped with divalent dysprosium.

The pumping source 14 may comprise any source of energy which is capable of exciting the ions in the solid active body from a lower energy level to a higher energy level. In other words, the pumping source is a source of energy which is capable of establishing the inverted population density condition, above the threshold level, in the active body 12. An example of such a pumping source is a xenon flash tube, or other suitable known types of energy sources.

Surrounding the active material 12, in this example, between the active material 12 and the pumping source 14 is a means for producing a magnetic field. In the embodiment shown in FIGURE 1, the magnetic field is produced by a conventional coil 20 which is uniformly wound around the solid active laser body. The coil 20 may comprise any conventional magnetic coil. As an example, the coil 20 may comprise about 270 turns of number 17 gauge copper wire. The coil 20 is for the purpose of producing a magnetic field which may be used to tune the frequency produced by the laser "oscillator" section 10, and to "fire" or switch the oscillator laser section 10. Other known systems of frequency tuning and/or laser switching may be used and the magnetic control is an example of such a system preferred in the present instance.

Positioned adjacent to the ends of the solid active body 12 are light reflecting members 16 and 18 which form the opposite ends of an optical resonant cavity. The light reflecting members 16 and 18 may be of any known type of light reflector such as the Fabry-Perot interference type light reflectors or the conventional mirror type. At least a portion of the light-reflecting surface 18 is partially transparent, e.g. about 10% transparent, so that a light output beam 22 may be obtained from the laser 10.

Spaced adjacent to the laser oscillator device 10 are a plurality, nine are shown, of laser "amplifier" devices or sections 24A–24I. Each of the laser amplifier devices includes an active laser body 12A–12I, a pumping source 14A–14I and a magnetic field producing means 20A–20I. Each of the laser amplifier devices may be made of the similar materials and configurations as the equivalent components of the laser oscillator device 10.

The laser amplifier devices 24A–24I are shown in FIGURE 1 as being spaced apart, for simplicity of illustration. However, as shown in FIGURE 2, which is an assembled end view taken at lines 2—2 of FIGURE 1, the amplifier devices 24A–24I may be in close contact with the pumping sources, for example 14A, 14D, 14G, abutting each other. In this structure a cooling medium (not shown) may be circulated around the amplifier stages 24A–24F.

The width of the fluorescent line is determined by the material selected as the active laser body portions. The material used for the body portions 12A–12I is selected so that the fluorescent line width is not greater than $gBH/h$, as was explained, where H is less than about 50 gauss.

As illustrated by the energy diagram of FIGURE 4, when the active laser body portions 12 and 12A–12I, are positioned in the magnetic fields produced by the coils 20 and 20A–20I, the energy levels between which the laser transitions take place will both split into three sublevels, e.g. $5I_7$ ($\tau_4$) level and the $5I_8$ ($\tau_5$) level of $Dy^{2+}$ in a cubic site.

In this system, the rates of splitting of the two levels are the same, within the accuracy of present observations. Therefore, the four possible transitions 26, 28, 30, 32 that are allowed when the magnetic field is applied along the (100) axis of the $CaF_2Dy^{2+}$ crystal, and the light output is also in this direction, shows as only two fluorescent lines. Actually, each of the fluorescent lines represent a pair of transitions 26–28 or 30–32, which represent substantially the same energy differences. The laser operates in these two lines only, and the laser can be tuned, by means of the magnetic field, into resonance in the laser oscillator 10 at either one of these two lines. Also, either of the two lines may be tuned to any desired frequency, throughout a wide range of frequencies, in the amplifier stages 24A–24I. The splitting of the energy level caused by the magnetic field is called the Zeeman effect.

When the magnetic fields are applied by the coils 20 and 20A–20I, the Zeeman splitting occurs as illustrated in FIGURE 4. For producing a high power laser beam, the frequency of the oscillator 10 is first determined. If the laser oscillator 10 is to be magnetically switched as illustrated, the magnetic field of the laser oscillator 10 is adjusted so that Zeeman splitting occurs and one of the fluorescent lines is tuned to a frequency for which the optical cavity is resonant, e.g. $10^{14}+4\times10^8$ c.p.s. Once this resonant frequency is selected, all of the frequencies in the amplifier stages 24A–24I are selected around, i.e. both above and below, the selected oscillator frequency for simplicity of magnetic field switching. In the above example, 24A may be operated at a frequency of $1.27\times10^{14}$ c.p.s.; 24B at $1.27\times10^{14}+10^8$ c.p.s.; 24C at $1.27\times10^{14}+2\times10^8$ etc. In any event, during storage, different magnetic fields are applied to the different amplifier stages 24A–24I so that no two amplifiers, in a straight line in any direction, are operating at the same frequency. In fact, it may be desirable, under certain conditions, that no major length of any one amplifier, e.g. amplifier 24A, be operating at the same frequency. This may be done by applying an inhomogeneous magnetic field to each amplifier stage. The inhomogeneous field may be produced by the varying of the number of turns per unit of length from one end to the other of each coil 20A–20I. Thus, for example, amplifier 24A may have a magnetic field applied thereto over the range of zero to ten gauss; amplifier 24B a field of 20 to 30 gauss; and amplifier 24I a field of 160 to 180 gauss.

With the different magnetic fields, which may or may not be inhomogeneous for each stage, applied to each of the amplifiers 24A–24I, the various pumping sources 14A–14I are turned on. When this is done, a population inversion is established in each of the various active bodies 12A–12I.

With the different magnetic fields applied to the various amplifier stages, any spontaneous emission from one of the amplifier sections, or any emission from the laser oscillator 10, passes through the other amplifier stages with substantially no disturbance of the energy stored therein.

When it is desired to "fire" the high power laser, the laser oscillator 10 is turned on at the resonant frequency $v_0$, and the magnetic field of all of the amplifier stages is changed so that the frequency of each amplifier stage substantially matches the frequency which is being oscillated in the laser oscillator 10. To do this, all of the magnetic fields are switched to substantially the same magnitude magnetic field. As was previously stated, the magnetic fields of the amplifier stages were selected both above and below that of the laser oscillator 10 so that this switching of magnetic fields preferably involves switching of the smallest possible magnitude of magnetic field. Other magnetic fields may be chosen and the fields described are merely an example. Thus, the laser oscillator 10 is a device which may be triggered, e.g. by the magnetic field from coil 20, to give a very short pulse which will be amplified by the amplifier sections 24A–24I.

The radiation from the laser oscillator 10 passes through a suitable optical system (not shown) so as to produce a parallel wave, within limits imposed by refraction, which fills the entire cross-section of the amplifiers 24A–24I. The laser oscillator is at substantially the same frequency (within a fraction, e.g. $\frac{1}{10}$, of a fluorescent line width of the material used as the amplifier laser bodies 12A–12I) as the frequency to which the amplifiers 24A–24I are all tuned at the moment the triggering radiation from the laser oscillator 10 enters the amplifiers. If the material used as the active bodies in the amplifiers 24A–24I is such that the fluorescent line width is less than the cavity mode spacing, then the same material may be used in the oscillator 10, and this oscillator 10 may be magnetically pulsed or switched into and out of resonance by the coil 20.

If desired, the magnetic fields may be switched to the matching or "sweep out" conditions sequentially. In other words, the laser amplifier elements 24A, 24D and 24G may be switched first. Then, as the wave front lands on elements 24B, 24E and 24H, these elements may be switched. This sequential firing may be electronically controlled by any conventional timing system 29, 29', and 29''. The timing system 29, 29' and 29'' may, for example, include a plurality of sequentially fired thyratrons. Thus the device operates similar to a traveling wave amplifier with high gain in only one direction to produce an extremely high output power pulse 44 which is a coherent light beam.

The embodiment illustrated in FIGURE 3 differs from that of FIGURE 1 in that a single pumping source 46 is used in the embodiment of FIGURE 3 to pump energy into a plurality of amplifier stages 12B, 12E, and 12H.

In the embodiment illustrated in FIGURE 5, the laser oscillator 10 and the laser amplifier stages 24' and 24'' are all included within a resonant cavity formed between light reflectors 16' and 18'. The components of this embodiment may be made of materials and structure similar to those previously described.

The operation of the embodiment of FIGURE 5 is that, in the presence of the different magnetic fields, each of the sections 12, 12' and 12'' are pumped to a level substantially above the level required for laser action. Then oscillations are induced by switching to the same resonant frequency in all of the stages. Since the amount of energy which can be stored is substantial, the output pulse may be adjusted to have an output power level substantially three times as great as that obtainable from a single body of the same active material. In the embodiment of FIGURE 5 any suitable number of sections of active laser body may be used although only three sections have been illustrated.

In the embodiment of FIGURE 5 the spacing between resonator modes may be greater than or less than the fluorescent line width. In fact, if a very large number of amplifier sections are used, the device is very long and therefore the mode spacing small. However, if the mode spacing is larger than the fluorescent line width, then the final uniform field should be chosen so as to tune the material onto a resonant mode of the cavity.

In the embodiments of this invention, a converging lens system (not shown) may be provided after the final amplifier stages to provide a well-focused high-power beam.

What is claimed is:

1. A high power laser device comprising a laser oscillator for producing a laser beam, a plurality of laser amplifier stages positioned in the path of said laser beam, means for pumping said laser amplifier stages, means for tuning each of said laser amplifier stages to a frequency that is different from the frequency to which any other amplifier stage is tuned to provide energy storage, and means for tuning all of said laser amplifier stages to substantially the same frequency.

2. A high power laser device comprising a laser oscillator positioned in an optical resonant cavity for producing a laser beam, a plurality of laser amplifier stages positioned in the path of said laser beam, means for pumping each of said laser amplifier stages, means for tuning each of said laser stages to a frequency that is different from the frequency of any other one of said laser amplifier stages, and means for sequentially tuning all of said laser amplifier stages to substantially the same frequency.

3. A high power laser comprising a laser oscillator positioned in an optical resonant cavity for producing a laser beam, a plurality of laser amplifier stages positioned in the path of said laser beam, means for pumping each of said laser amplifier stages, means for tuning each of said laser stages to a frequency that is different from the frequency of any other one of said laser amplifier stages, and means for sequentially tuning all of said laser amplifier stages to substantially the same frequency as emitted by said laser oscillator.

4. The method of providing a high power laser beam comprising the steps of magnetically tuning a laser oscillator and a plurality of laser amplifier sections to different frequencies, pumping said laser oscillator and said laser amplifier sections, and sequentially tuning said laser oscillator and said laser amplifier sections to the same frequency.

5. The method of providing a high power laser beam comprising the steps of magnetically tuning a laser oscillator and a plurality of laser amplifier sections to different frequencies, pumping said laser oscillator and said laser amplifier sections, and tuning said laser oscillator and said laser amplifier sections to the same frequency.

6. A laser system comprising
a plurality of separate sections of a solid active laser body positioned in an optical resonant cavity,
means for pumping each of said sections of active laser body substantially above the threshold level to produce laser action,
means for applying a different magnetic field to each of said sections of active laser body, and
means for switching said magnetic field to apply substantially the same amplitude magnetic field to all of said sections whereby a high power laser beam from all of said sections is obtained.

7. A high power laser device comprising a laser oscillator for producing a laser beam, a plurality of laser amplifier stages positioned in the path of said laser beam, means for pumping said laser amplifier stages, and means for first tuning each of said amplifier stages to a frequency that is different from the frequency to which any other amplifier is tuned to provide energy storage and thereafter for tuning all of said laser amplifier stages to substantially the same frequency.

References Cited by the Examiner

UNITED STATES PATENTS

| | | | |
|---|---|---|---|
| 2,929,922 | 3/1960 | Schawlow et al. | 331—94.5 |
| 3,213,281 | 10/1965 | Nedderman | 331—94.5 |
| 3,247,467 | 4/1966 | Geusic et al. | 331—94.5 |

OTHER REFERENCES

Electronic News "Pulsed Lasers in Tandem," May 21, 1962, page 43.

JEWELL H. PEDERSEN, *Primary Examiner.*

R. L. WIBERT, *Assistant Examiner.*